United States Patent Office 2,816,007
Patented Dec. 10, 1957

2,816,007

METHOD OF EXTRACTING LITHIUM FROM ITS SILICO-ALUMINOUS ORES

Adolphe Victor Kroll, Grevenmacher, Luxembourg, assignor to Compagnie Geologique et Miniere des Ingenieurs et Industriels Belges "Geomines" Societe par Actions a Responsabilite Limitee, Manono (Belgian Congo), Brussels, Belgium, a Belgian-Congo company No Drawing. Application August 13, 1953,
Serial No. 374,113

Claims priority, application Luxembourg August 22, 1952

9 Claims. (Cl. 23—27)

The most interesting methods of preparation and extraction of lithium compounds from the ores of the latter are those which are based on an exchange of cathodic ions between the lithium ore and saline ionized reagents, the ore being treated for this purpose with heating either by an aqueous salt solution, or without water, by salts melted or softened by heat.

The treatment with an aqueous saline solution necessitates generally the use of an autoclave, an operation rather onerous, whereas the treatment by salts in partial or complete fusion hitherto necessitated an application of high fusion temperatures which entrained considerable losses by volatilization, or by scorification, and produced secondary reactions on the ore and pollution of the extraction bath. The consumption of the extracting salt was considerable.

The method forming the subject of the present invention concerns the second type of ionic exchange carried out in the dry state with heat and it is mainly characterised by the utilisation of saline reagents which react at very moderate temperatures by a cationic exchange of metal with the lithium ore. In other words: in lieu of treating the ore mixed with a salt having a relatively high temperature of fusion, such as potassium sulphate (1076° C.), or sodium sulphate (884° C.), or calcium sulphate mixed with quantities of lime (beyond 1100° C.), the lithium ore is treated according to the present invention with a salt such as anhydrous sodium acetate, the melting point of which is only 324° C., or with sodium nitrate (melting point 308° C.), or with sodium chlorate (melting point 248° C.), or other organic mineral salts of this type, which may also be salts of potassium alone or in admixture with others.

Another characteristic than that of the low melting point of the salts used according to the invention in the reaction with the lithium ore is the easy decomposition of these salts by thermal dissociation. This characteristic differs greatly from the nature of the salts generally used for the ionic exchange such as the neutral sodium and potassium sulphates. The easy dissociation of the ionic reagents used according to the invention greatly facilitates the entry into action of the ions relaxed by the heat, the dissociated bodies seeking stabilization in a new equilibrium by an exchange of ions with the ores.

The law of mass action also plays a part in the establishment of a new state of equilibrium.

But the choice of as low a reaction temperature as possible is a guarantee that the exchange of ions is restricted to that of the alkaline cations, which renders possible the extraction of lithium salts of great purity.

It must be taken into account however that the lithium salts formed by this exchange of ions with salts which are only slightly stable under heat, are also very fragile and for this reason an exact control of the reaction temperatures is required. Therefore it is preferable to execute the heating by making use of a molten salt or an oil bath.

Among the silico-aluminous ores of lithium, spodumene was for a long time reputed to be strongly resistant to the usual methods of extraction. But it has also been recognized for more than twenty years that its beta variety was much softer and much more accessible to chemical treatment. Several recent methods have already profited from this peculiarity.

In order to obtain the beta modification of spodumene it suffices to heat this ore to a temperature of about 1050 to 1150° C. when it is pure. A sudden change of its specific volume takes place at this temperature due to expansion which renders the mass very friable and causes it to decrepitate into a fine powder if it is agitated.

Science has even shown that there probably exists a third modification of spodumene known as "gamma."

Anyhow, it has been found according to the present invention, that the ore which became pulverulent by decrepitation under agitation becomes much more accessible to chemical reactions, if it is subjected preliminarily to a greater heat which causes its partial or even total fusion into liquid state (between 1150° C. and beyond 1400° C.), and if after cooling it is subjected to a fine grinding.

For this reason, in the present method, there is preferably used spodumene which has been preliminarily decrepitated by heat or subjected to a light fusion (sintering or agglutination), or even to a complete fusion followed by a sudden cooling.

Hereinafter there are described several non-limitative examples of the present method which have given very good results in the case of the treatment of spodumene at very moderate temperatures by salts having a relatively low melting point used according to the invention.

In these examples the parts indicated are parts by weight.

Example 1

One part of spodumene decrepitated and ground in a mill in such manner as to pass a screen of 10,000 meshes per cm.$^2$ is mixed with ¾ of a part of anhydrous sodium acetate, also ground, but only sufficiently to be able to pass a screen of about 2500 meshes per cm.$^2$. Instead of the anhydrous salt there may be added 1.25 parts of the salt crystallized with three molecules of water, or an aqueous solution of this salt. The proportion chosen is arbitrary and corresponds about to double the quantity entering into reaction with a spodumene titrating 6.8% of $Li_2O$. An excess of reagent is in all cases useful.

When water is present heat is first slowly applied in order to remove it by evaporation, this result being reached below 120° C.

Heating is continued and before the melting point of pure anhydrous sodium acetate is reached, the exchange of the ions of sodium and of lithium takes place in the mixture, the presence of the lithium acetate already formed manifesting itself by a strong lowering of the melting point of the sodium acetate present (280° C. instead of 324° C.). It is preferable, in order to obtain a complete yield not to interrupt the heating step at this moment, but to increase the temperature slowly to about 324° C.

As the lithium acetate formed is less resistant to heat than the sodium acetate, it is advisable not to exceed the temperature indicated, since otherwise thermal decomposition of lithium acetate may commence with formation of lithium carbonate and acetone vapours.

After cooling, the mass forms a rather hard cake, which it is preferable to grind rather finely, for example in such manner that the ground product will pass a screen of 2500 meshes. This grinding considerably facilitates the subsequent treatment by lixiviation with water, advantageously boiling water.

Having regard to the very great solubility of the acetates (170 parts in 100 parts of water at 100° C. for the sodium salt and more than 300 parts in 100 parts of water for the lithium salt) it is possible to obtain, particularly by countercurrent lixiviation, a very concentrated salt solution containing easily 90% of the lithium content of the ore, the residue being separated from this solution without difficulty by filtration and countercurrent washings, or by draining and washing, or by treatment in countercurrent "Dorr" thickeners.

By a systematic lixiviation of this kind a separation of the residue which is nearly free from lithium may be attained and a saline solution obtained containing 50 g. of $LiO_2$ per litre.

When a filter is used by which two washings of the residue by counter current may be carried out, the quantity of washing water added to the filtrate may cause its volume to increase by about 50 to 100%.

In general, especially if the lixiviation provides a less concentrated liquid, or if the content in salts of the solution obtained is reduced by washing water, it is convenient to effect concentration by evaporation, since it has been found that this concentration causes the formation of a purification precipitate in the solution of the acetate salts. It is to be noted that a great advantage of the present method consists in the fact that during the lixiviation with water of the product of fusion with acetate, the major part of the impurities such as the compounds of iron, of aluminium, silicon, tin, zinc, lead, etc. remains in the residue. The small quantity of these impurities which enters into solution, precipitates thereafter during concentration of the lixiviation solution and is easily filterable at this time. The filtrate then contains only lithium salts and an excessive quantity of sodium salt, so that a final very pure compound of lithium can be obtained.

As the thermal decomposition of the sodium or lithium acetate, even if it occurs to a very small extent, may produce organic products which give a caramel colour to the aqueous solution, it is desirable to eliminate them, if present, by an addition of a decolourant such as animal black, bentonite, etc. and then to filter the saline liquid, which filtration is best carried out at the moment of removing the impurities precipitated by concentration.

Whatever the salt or the lithium compound which is finally separated from the lixiviation solution (purified or not) and whatever the manner of this separation, the latter may be combined with the present method of extraction of the lithium from its silico-aluminous ores constituting the first phase of the operation and consisting in effecting the exchange of the alkaline ions in question by the use of salts reacting at a moderate temperature with the ore.

Nevertheless, the precipitation of the lithium in the form of carbonate will be described by way of example, having regard to the particularly favourable circumstances of this form of application of the present method.

*Example 2*

The lixiviation solution concentrated for example to a content corresponding to 50 gr. of $Li_2O$ in a litre of water (contained therein as lithium acetate) is heated to 100°. There is added slowly and gradually a concentrated and boiling solution containing 177 gr. of pure sodium carbonate, i. e. exactly the quantity which is necessary to precipitate 50 gr. of $Li_2O$ per liter as $Li_2CO_3$. The filtered or drained and washed precipitate contains all the lithium present except the part of lithium carbonate which remains dissolved in the dissolving and washing water. This lithium is not lost: the solution of sodium acetate containing the remainder of lithium carbonate, itself regenerated by the precipitation reaction in question is concentrated by evaporation or even reduced to the dry state at 120° C. and its salt content is recycled in forming a new pulp or a new mixture with a fresh portion of spodumene decrepitated and pulverized in order to undergo the treatment by exchange of ions.

It has been found by minute tests that even when the sodium acetate (or sodium nitrate) is present in high concentration as mentioned in the above example with an excess of sodium acetate of 100% more than the reaction with the mineral may require and in a solution containing 50 gr. of lithium oxide ($Li_2O$) per litre of water, the solubility of the lithium carbonate does not increase to an appreciable extent. It remains less than 1% at 100° C. It is thus hardly worth while adding an excess of $Na_2CO_3$ in order to urge the precipitation of the $Li_2CO_3$.

As, on the other hand, the presence of an excess of $Na_2CO_3$ in the mixture of the salts recovered, produces, after the new fusion, at the moment of lixiviation with water of the finely ground cake, a precipitate of $Li_2CO_3$, which remains for the most part in the residue of the spodumene during the filtering operation, it is preferable to avoid it, unless it is added deliberately in order to compensate for the unavoidable losses in sodium acetate, and the excess of soda is neutralized later with acetic acid.

Such a compensating operation will preferably be carried out after filtering the $Li_2CO_3$ in the solution intended for recycling and before its evaporation.

Any loss of lithium caused by an excess of soda may also be recovered for example by adding acetic acid to the lixiviation water, or by bringing the residue after completed washing with water to the state of a new pulp prepared with a very slightly acidulated water, in a proportion corresponding to the quantity of lithium carbonate to be dissolved, the acidulation being effected for example with pure acetic acid or with HCl, $HNO_3$ or $H_2SO_4$.

In this case the lithium salts are easily recovered from these acids by evaporation of the solution, or the lithium carbonate by precipitation.

If, for one reason or another, lithium carbonate is present in the residue, it may also be extracted to a sufficient extent by a very abundant washing in cold water, or more simply by adding, during the period of lixiviation, a calculated proportion of acetic acid. Thus, there may be compensated at the same time losses in acetic salt, caused by a thermal dissociation of the acetates, unavoidable to a certain extent in working on an industrial scale.

A means of eliminating excess $Na_2CO_3$ or other salts which are much less soluble than sodium acetate is available during concentration by evaporation of the solution of salts to be recycled:

It is sufficient to remove the first crystals which are deposited. Thus there are eliminated also the impurities introduced by the soda in the cycle where they are gradually concentrated, notably NaCl, $Na_2SO_4$, etc.

It is opportune to note also that the new method is not restricted solely to the possibilities resulting from an extraction with water of the more or less accentuated fusion cake, of salts and of spodumene, in order to remove therefrom soluble compounds of lithium and to recover the said compounds from the solution in one or other way, or to use the solution as such. Extraction of the cake by other liquids than water, for example by special alcohols, such as amyl alcohol, or by other solvents, such as pyridine, may be applied with success, particularly with a view to obtaining very pure lithium compounds, having regard to the well known selectivity of these liquids for lithium salts.

The new method permits of obtaining in a particularly favourable manner the exchange of ions between the ore and the easily fusible salts, when the latter are reduced by heat to a moistening state or to a state of simple softness, or to a state of partial or absolutely complete fusion, i. e. to a liquid state, even superheated.

*Example 3*

This latter possibility permits also the extraction of lithium compounds by washing of the ore moderately heated, by means of molten salts by causing the bath of the molten salt also at a moderate temperature to flow slowly across layers of the lithinous ore, forming a porous bed in which it is in a state of broken pieces in the form of grains, or of finely pulverized material. The exchange of ions is sufficiently rapid for making the dissolution of the lithium ore by the molten salt to be a true lixiviation without water and a real extraction at a hot state, but at moderate temperature.

Washing with molten salt may be effected even in counter-current, where the purest molten salt first traverses the fine or granular ore, most exhausted of lithium, whereas the molten salt more or less saturated with lithium finally traverses a layer of still fresh ore.

The molten salts more or less saturated with lithium may then be subjected after cooling to an aqueous or other separation treatment.

Example 4

If, instead of sodium acetate, the use of sodium nitrate is preferred for the ion exchange with the lithinous ore, at a moderate heat, without the presence of water, the same proportion of one part of spodumene to ¾ of a part of sodium nitrate, in finely ground mixture may be maintained. But since the spodumene simply decrepitated to its beta modification and very finely ground so as to pass a screen of 10,000 meshes per $cm.^2$, has only given a very low yield in lithium extracted, tests made with the same sample of ore, but completely melted at about 1350° C. and then cooled and ground to the same state of fineness, have given a yield of extraction exceeding 90% of lithium, an equivalent part of the sodium having been absorbed by the ore.

During the ion exchange treatment with the nitrate, it is preferable not to exceed much the melting point of the salt which is 308° C., having regard to the fact that the decomposition of sodium and lithium nitrates with the formation of nitrites, which occurs at a rather high temperature decreases considerably the yield of lithium extracted.

Example 5

By making the same tests with sodium nitrite in admixture with the spodumene preliminarily melted, cooled and ground very finely, the yield of lithium extracted was 80%, the melting point of the salt being about 271° C. Much higher temperatures led to emanation of oxygen and of brown nitrous vapours.

Among the other salts the composition and the nature of which are suitable for the ion exchange reaction according to the present invention there must be noted sodium chlorate with the melting point of 248° C., whereas the lithium chlorate formed is decomposed at 270° with release of oxygen. But the presence of the powdered siliceous ore in the mixture seems to have destroyed the low stability of the two salts and reduced greatly the yield of lithium.

It is to be noted that the lithium ore used according to the examples above was of very pure composition. However an addition of calcium oxide or of other alkaline or alkaline earth oxidic compounds incorporated in the ore by a preliminary calcination at high temperature, increases considerably the facility of ionic exchange produced by the salts having a relatively low melting temperature, described above. The oxides which are thus chemically incorporated in the ore do not enter noticeably into solution during lixiviation with water.

Similarly the addition of small quantities of salts or of alkaline or alkaline earth oxidic compounds such as for example sodium hydroxide, sodium chloride, sodium sulphate, etc. to the mixture of lithinous ore and of salts having a low melting point, forming the subject of the present invention, may favour the ionic exchange reaction and influence favourably the point of fusion or of reaction of the mixture.

Among the advantages obtained by the present method are the following:

The most widespread lithium ore, spodumene, in its beta or gamma modification, lends itself particularly well to the extraction of its lithium content by the alkaline salts having a moderate melting temperature and having moreover a chemical composition which ensures their thermal dissociation and a rapid exchange of ions under heat.

These salts moreover are very soluble in water, and this fact permits of using, in the case of wet lixiviation, concentrated solutions of salts and of thus saving the high costs of concentration by evaporation.

The even greater solubility in water of the corresponding lithium salts formed by exchange of ions permits of carrying out the extraction with water in an easy and very complete manner.

As the regeneration and the recycling of the extraction salts may be carried out in a very simple manner and almost without losses and as the lithium salts which have not been caught are returned at the same time to the cycle of operation, the total extraction yield may approach 100%.

In practice the present method may be carried out in such manner as to consume, apart from the ore, only sodium carbonate and that in a quantity equivalent to that of the lithium carbonate collected as well as a very small quantity of sodium acetate or other salt exchanger of ions used according to the invention. The losses produced by thermal dissociation and by incomplete washing may be limited by using a well constructed plant.

As the exchange of ions occurs at a very moderate temperature, there are only very few impurities which enter into solution with the lithium salt. The expenses of heating are very small, the chemical cleaning treatment is simplified and the products obtained are of great purity.

The present method may be carried out by neutral or non-corrosive solutions and with baths of neutral or slightly alkaline salts. Any noxious products may be discarded.

The present method permits of continuous operation with very simple apparatus, the use of which is well known in the chemical industry.

It permits of dispensing with the use of an autoclave which is liable to explosion danger.

The purification of the aqueous lixiviation solution is affected at the moment of concentration of the said solution by evaporation, especially of the solutions of acetate salts which precipitate the slight impurities which they contain.

It is not without interest to observe that in certain earlier methods sulphuric acid or neutral sodium sulphate mixed with sulphuric acid or also the acid salt called sodium bisulphate have been used, in order to extract the lithium contained in the lithium ore, inter alia in natural spodumene (alpha) by its transformation into lithium sulphate soluble in water.

This extraction is simply due to the free sulfuric acid or acid liberated under moderate heat. There is no exchange of lithium cations for sodium cations, but a direct combination between the anionic radical $SO_3$ and the cation Li. Cationic sodium cannot enter into the residue, unless at the very high melting point of the neultal sodium sulphate (884° C.) which alone can furnish the sodium cation for replacing that of the lithium, which would destroy the advantage of an exchange of ions at moderate temperature. This method is thus different from that of the invention which is based on the cationic exchange of alkaline metals for lithium at very moderate temperatures.

I claim:

1. The method of producing water-soluble lithium salts from silico-aluminous lithium ores which comprises first heating the ore to a temperature above about 1050° C. to improve its workability, cooling and then treating the calcined ore with a saline cation exchange agent selected from the group consisting of sodium and potassium acetates, at a temperature between about 280° and 324° C. in the dry state, cooling the reaction product and extracting the soluble lithium salt therefrom with a solvent.

2. The method of claim 1 wherein the lithium ore is spodumene.

3. The method of claim 1 wherein the cation exchange agent is sodium acetate.

4. The method of claim 1 wherein the extraction solvent is water.

5. The method of producing water-soluble lithium salts from silico-aluminous lithium ores which comprises first heating the ore to a temperature above about 1050° C. to improve its workability, cooling and then treating the calcined ore with a saline cation exchange agent selected from the group consisting of sodium and potassium acetates, at a temperature between about 280° and 324° C., in the dry state, cooling the reaction product, extracting the soluble lithium salt therefrom with a solvent, and treating the extract solution with an alkali carbonate to precipitate lithium carbonate and to regenerate the saline cation exchange agent for re-use.

6. The method of producing water-soluble lithium salts from silico-aluminous lithium ores which comprises first heating the ore to a temperature from about 1050° to 1400° C., finely grinding the calcined ore, then heating the ore between about 280° and 324° C. with a saline cation exchange agent in the dry state, selected from the group consisting of sodium and potassium acetates, cooling the reaction product and extracting the soluble lithium salt therefrom with a solvent.

7. The method of producing water-soluble lithium salts from spodumene which comprises calcining the spodumene at a temperature between 1050° and 1350° C., finely grinding the calcined ore, treating the ore with a saline cation exchange agent selected from the group consisting of sodium and potassium acetates in the dry state at a temperature between about 280° and 324° C., cooling the reaction product, and extracting the resulting lithium acetate therefrom with water.

8. The method of producing water-soluble lithium salts from spodumene which comprises calcining the spodumene at a temperature between about 1050° and 1350° C., finely grinding the calcined ore, treating the ore with sodium acetate in the dry state at a temperature between about 280° and 324° C., cooling the reaction product, and extracting the resulting lithium acetate therefrom with water.

9. The method of claim 8 wherein the amount of sodium acetate calculated as anhydrous salt is approximately 75% by weight of the ore treated.

References Cited in the file of this patent

UNITED STATES PATENTS

| | | |
|---|---|---|
| 836,781 | Poulenc | Nov. 27, 1906 |
| 847,856 | Wadman | Nov. 19, 1907 |
| 1,344,705 | Messerschmitt | June 29, 1920 |
| 1,678,246 | Edison | July 24, 1928 |
| 1,710,556 | Von Girsewald | Apr. 23, 1929 |
| 2,040,573 | Siegens et al. | May 12, 1936 |
| 2,331,838 | Lindblad et al. | Oct. 12, 1943 |
| 2,516,109 | Ellestad et al. | July 15, 1950 |
| 2,561,439 | Erasmas | July 24, 1951 |